INVENTOR.
CHARLES L. TANNER
BY Mason & Graham
ATTORNEYS 3,163,431
SEAL RING MEANS
Charles L. Tanner, 1641 Bedford St.,
Los Angeles 35, Calif.
Filed June 6, 1960, Ser. No. 34,261
6 Claims. (Cl. 277—206)

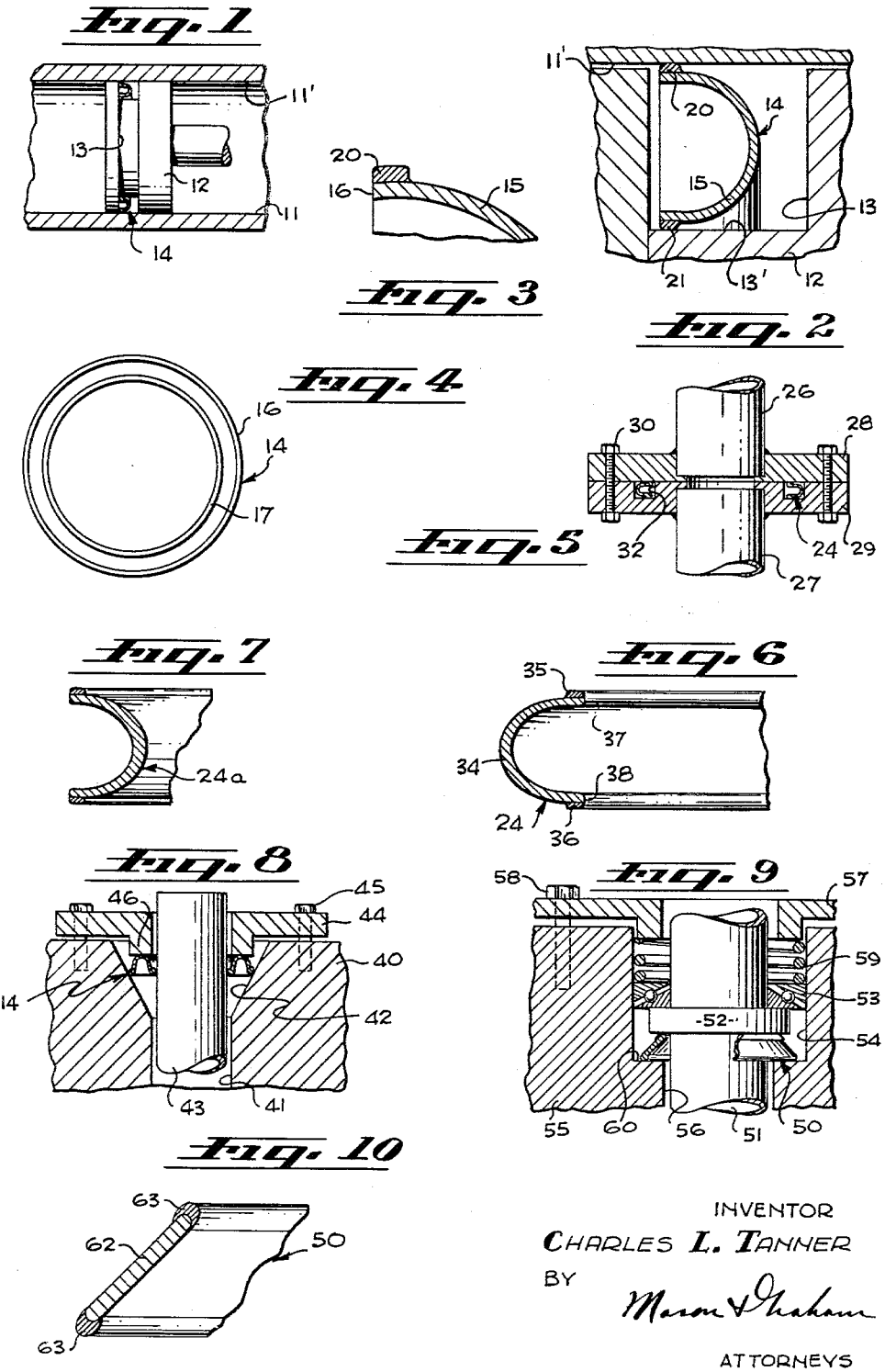

This invention has to do generally with seal rings for use between spaced opposed surfaces sealingly to engage such surfaces and form a barrier therebetween against passage of fluid.

In recent times there has been an increasing need for improved means to provide an effective seal between metal surfaces under widely variable temperature conditions and particularly where the parts are subjected to such high temperatures as to render impracticable the use of conventional resilient seal rings, such as O rings. While several attempts have been made to develop metal seal rings to solve the problem, the resulting rings have not proved entirely satisfactory.

Therefore, an object of the invention is to provide a novel and improved seal means which is designed for use under widely variable temperature conditions and particularly such a seal means which is effective at elevated temperatures.

A further object is to provide a seal ring having a body of relatively stiff, spring metal which can be flexed somewhat when placed in the environment in which it is to function and to provide integral surface portions of a ductile or malleable metal on the body for engagement with the surfaces against which sealing contact is to be made. In this connection it is an object to provide several different basic shapes of seal rings suitable for a variety of installations.

A further object is to provide a seal ring of the general characteristics referred to which can be readily and economically fabricated.

These and other objects will be apparent from the drawings and the following description. Referring to the drawings, which are for illustrative purposes only:

FIG. 1 is a fragmentary sectional view of a cylinder showing a piston therein fitted with a seal ring embodying the invention;

FIG. 2 is a fragmentary cross sectional view of the seal ring and adjacent parts of FIG. 1, but on a larger scale;

FIG. 3 is a fragmentary cross sectional view showing in detail a portion of the ring of FIGS. 1 and 2, but on a larger scale than FIG. 2;

FIG. 4 is an end elevational view of the ring of FIG. 1 but on a somewhat larger scale than FIG. 1;

FIG. 5 is a sectional view showing a flanged joint and a seal ring therein embodying the invention;

FIG. 6 is an enlarged fragmentary sectional view of the seal ring of FIG. 5;

FIG. 7 is a view similar to FIG. 6 but showing an alternate shape of ring;

FIG. 8 is a sectional view showing a seal ring similar to the ring of FIG. 1 but in a different environment;

FIG. 9 is a sectional elevational view of another form of the seal ring of the invention shown in a specific environment;

FIG. 10 is an enlarged, fragmentary, cross sectional view of the ring of FIG. 9;

Figure 11:
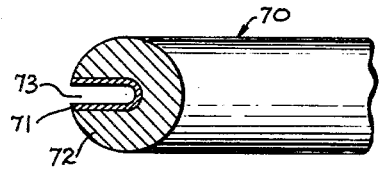
FIG. 11 is a view in section, similar to FIG. 7, but showing another form of seal ring.

More particularly describing the invention, referring first to FIGS. 1 to 4, I show a cylinder 11 with a piston 12 therein, the piston having a groove 13 in which is mounted a seal ring 14. The latter comprises an annular, somewhat channel-shaped body 15 which is preferably formed to be stiffly resilient. It may be made of a tempered spring metal so as to be resilient throughout or it may be so made that it is only springy or resilient in one or more given regions. Adjacent the edges 16 and 17 of the ring I provide a coating or layer of a ductile metal which is bonded to or made integral with the body 15 in any suitable manner as known in the art and as required by the characteristics of the metals chosen for a particular ring. Thus, around the periphery of the ring adjacent its edge 16 I provide a bead 20 of malleable or ductile metal. Also adjacent the edge 17 around the inner surface or inner periphery of the body I provide the bead 21 of malleable or ductile metal.

Various metals may be used for the body of the ring, heat treated steel being suitable for most installations. Preferably the metal should be one which can be treated to render it stiffly resilient. Numerous metals might be used for the ductile or malleable portions of the seal ring, some examples being gold, silver, platinum, copper, lead. It is not essential that two different metals be used since it is possible to use different qualities or types of the same metal for both the body and seal portions of the ring. Thus a high-carbon heat treated spring quality steel might be used for the body of the ring and a low-carbon steel having ductile and malleable qualities used for the seal portions. It will be apparent that the seal portions of ductile metal can be joined to the body of the ring by any of several known methods, such as electroplating, brazing, soldering and others.

By referring to FIGS. 1 and 2 it will be seen that bead 20 is designed to engage the inner surface 11' of the cylinder while the bead 21 is designed to engage the bottom or inner wall 13' of groove 13 in the piston. Preferably the outer diameter of the seal ring is slightly larger than the inner diameter of the cylinder and preferably the inner diameter of the ring is slightly less than the diameter of the groove surface 13' so that, when installed, the body of the ring will necessarily be flexed somewhat and serve to resiliently hold the two beads 20 and 21 firmly pressed against the surfaces 11' and 13', respectively, which they are designed to sealingly engage. Thus the peripheral region of the seal ring will be slightly compressed while the inner peripheral region will be slightly expanded and the two ductile beads 20 and 21 slightly deformed into sealing engagement with the surfaces 11' and 13', respectively.

While the beads 20 and 21 are shown as relatively substantial in size and thickness as compared to the body of the ring, in many cases it may only be necessary to provide a relatively much thinner layer or coating of ductile metal.

Referring now to FIGS. 5 and 6 wherein we show the seal ring used as a static seal in a flanged joint, it will be noted that the ring shown in FIGS. 5 and 6, and here designated 24, has a channel-shaped cross section but in this case the open portion thereof faces radially inward of the ring while in the ring of FIGS. 1 to 4 the channel faces axially of the opening through the ring. In FIG. 5, pipes 26 and 27 are shown provided with flanges 28 and 29 respectively which are secured together by nut and bolt means 30. The flange 29 is shown as having a circular groove 32 in its end surface to accommodate the seal ring 24. It is to be understood that the axial thickness of the ring is slightly greater than the depth of groove 32 so that, in assembly, the ring is somewhat compressed between the two flanges.

Ring 24 comprises the body portion 34 which may be formed of a spring tempered metal such as steel, and two beads designated 35 and 36 of ductile metal integral with the body or bonded thereto in any suitable manner. The beads are on the outer surfaces of the body adjacent the edges 37 and 38 respectively and project axially farther than any other portion of the ring whereby they are in position to sealingly engage axially spaced surfaces between which the ring is placed.

In FIG. 7 there is shown an alternate form of ring which is generally similar to the ring of FIGS. 5 and 6 and has therefore been designated by numeral 24a. The chief difference between rings 24 and 24a is that in ring 24a the opening to the channel is on the periphery of the ring rather than facing radially inward as in ring 24.

In FIG. 8 I show the ring 14 installed in a member 40 having a bore 41 therethrough provided with a conoidal entry portion 42. A tube 43 is shown in the bore 41 and projecting thereabove. A gland 44 is adjustably positioned by cap screws 45 and this has an axial extension 46 bearing upon the body of the seal ring 14. It will be apparent that the gland 44, when properly adjusted, serves to force the seal ring into sealing engagement with the surface 42 and the pipe 43.

Referring now to FIGS. 9 and 10, I show another form of seal ring, designated by numeral 50, associated with a tubular member 51 having a flange 52. The latter is adapted to run against a bearing member 53 received in a counterbore 54 of member 55. The latter has a bore 56 receiving member 51. A gland 57 is adjustably positionable by cap screws 58 against a stiff spring 59 above bearing 53. Between the flange 52 and the shoulder 60 is a conoidal-shaped seal ring 50 which comprises a body 62 of spring tempered metal and annular end portions 63 of a ductile or malleable metal which is bonded or otherwise made integral with the body. With this construction the ductile end portions 63 bear against the flange 52 and shoulder 60 respectively and are brought firmly into engagement with such surfaces by adjusting the gland 57 so as to compress spring 59 and slightly distort or flex the body 62 of the seal ring.

In FIG. 11 I show a modified form of the invention wherein a seal ring 70 is shown as having a U-shaped or channel-shaped body 71 which is preferably made of a spring tempered metal and this is covered on its outer surface with a relatively thick body 72 of malleable or ductile metal. In this form of the invention the cross sectional area of the ductile metal greatly exceeds that of the body while in the other forms the cross sectional area of the body greatly exceeds that of the ductile material. While I show the opening 73 into the body as being on the periphery of the ring, I contemplate that the ring may be made with the opening facing either radially inward or axially.

Figure 13:
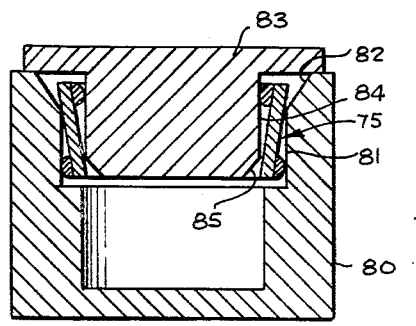
FIG. 13 is a sectional view of a joint embodying the seal ring of FIG. 12.
Figure 12:
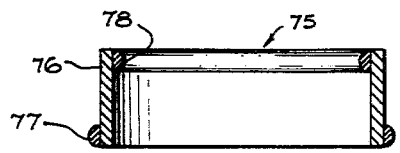
FIG. 12 is a cross sectional view of still another form of seal ring.

Referring now to FIGS. 12 and 13 I show still another form of the invention wherein a seal ring 75 comprises a cylindrical body 76 of spring metal such as steel. A peripheral bead 77 of ductile metal is provided at one end and on the periphery of the body. At its opposite end, on its inner surface, the body is provided with an inner bead 78 of ductile metal.

When the seal ring 75 is installed the body 76 is flexed somewhat as will appear from a description of FIG. 13 wherein 80 designates a container having an open end 81 of cylindrical shape and providing a flared mouth surface 82. A plug or closure 83 having a cylindrical face 84 and a tapered entry face 85 is shown associated with the member 80 and inserted partially therein. The seal ring 75 is shown effecting a seal between the surface 81 of member 80 and the surface 84 of member 83. Also the seal ring has been shown somewhat exaggerated as to the flexing of the body which necessarily takes place as the parts are assembled. In this connection, the inner diameter of the bead 78 of the seal ring is made somewhat less than the diameter of the surface 84 and the diameter of bead 77 is made somewhat greater than the diameter of surface 81. Hence, when the parts are assembled, the ring is flexed as shown.

Figure 14:
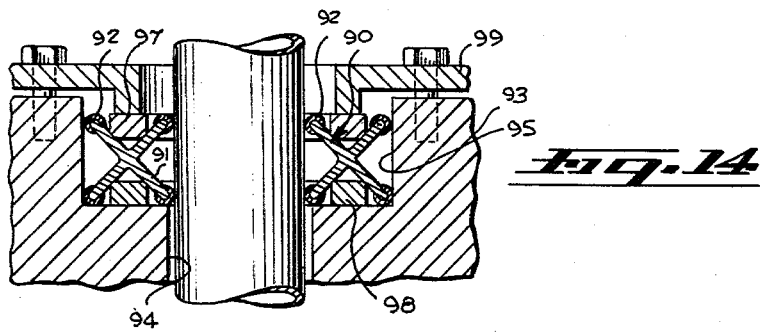
FIG. 14 is a cross sectional view of another form of seal ring shown in conjunction with a gland and associated structure.

In FIG. 14 I show still another form of the invention wherein a seal ring 90 is shown as having a body 91 of X-shape in cross section. This body should be made of a spring metal and the edge portions thereof at the ends of the arms of the X, as viewed in cross section, coated or covered with ductile metal designated 92. While this type of ring may be merely made slightly oversized for the space it is to occupy and then forced into place, I show in FIG. 14 a construction wherein a member 93 having a bore 94 and a counterbore 95 receives the ring. In order to expand the seal ring, expansion rings 97 and 98 are provided and a gland 99 serves to adjustably wedge these into the seal ring and flex the ring into sealing engagement.

Although I have illustrated and described preferred forms of my invention, I contemplate that various changes and modifications can be made therein without departing from the invention, the scope of which is indicated by the following claims.

I claim:

1. In combination, a first metal member presenting an annular surface, a second metal member presenting an annular surface spaced from and opposed to said first-mentioned annular surface, said annular surfaces being substantially rigid, a metal seal ring between said surfaces, said ring being characterized by an annular body of stiffly resilient spring metal so shaped as to be capable of being flexed and having an integral body of ductile metal over its peripheral portions in engagement with said annular surfaces, means cooperatively associated with at least one of said members flexing said ring body between said surfaces, said annular surfaces of said metal members and the ductile metal-covered portions of said seal ring being so shaped relative to each other that the annular areas of the ductile portions of the seal ring in contact with said annular surfaces are small and approach line contact whereby a relatively light loading of the body of the seal ring and resultant flexure thereof produces a high loading of said annular areas of the ductile portions of the seal ring contacting said annular surfaces.

2. A metal seal ring as set forth in claim 1 in which said body of spring metal is channel-shaped in cross section.

3. A metal seal ring as set forth in claim 1 in which said body of spring metal is conoidal-shaped.

4. A metal seal ring as set forth in claim 1 in which said body of spring metal is cylindrical.

5. A metal seal ring as set forth in claim 1 in which said spring metal body is U-shaped in cross section and in which a substantially thicker body of ductile metal is bonded to and covers the outer surface of the body.

6. A metal seal ring as set forth in claim 1 in which said body of spring metal is X-shaped in cross section.

References Cited in the file of this patent

UNITED STATES PATENTS

| | | |
|---|---|---|
| 1,700,894 | Joyce et al. | Feb. 5, 1929 |
| 1,825,962 | Laird | Oct. 6, 1931 |
| 1,965,273 | Wilson | July 3, 1934 |
| 2,844,426 | Glaser | July 22, 1958 |
| 2,976,066 | Antoniades | Mar. 21, 1961 |